(No Model.)

L. SCHWAAB.
HORSESHOE.

No. 323,601. Patented Aug. 4, 1885.

WITNESSES:

INVENTOR:
L. Schwaab
BY Munn & Co.
ATTORNEYS.

UNITED STATES PATENT OFFICE.

LAWRENCE SCHWAAB, OF NEW YORK, N. Y.

HORSESHOE.

SPECIFICATION forming part of Letters Patent No. 323,601, dated August 4, 1885.

Application filed October 8, 1884. (No model.)

*To all whom it may concern:*

Be it known that I, LAWRENCE SCHWAAB, of the city, county, and State of New York, have invented new and useful Improvements in Horseshoes, of which the following is a full, clear, and exact description.

Reference is to be had to the accompanying drawings, forming part of this specification, in which similar letters of reference indicate corresponding parts in all the figures.

Figure 1:
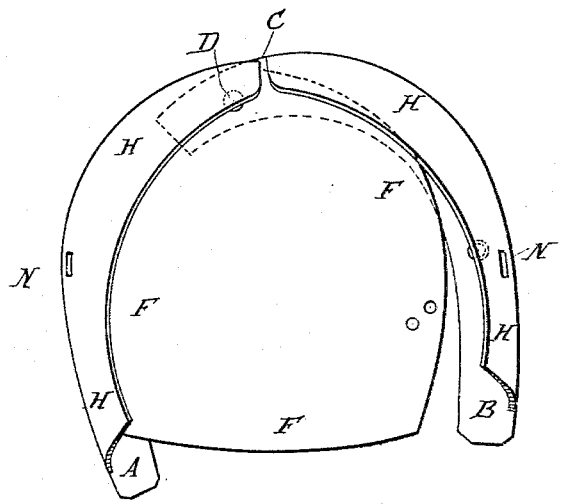
Figure 2:
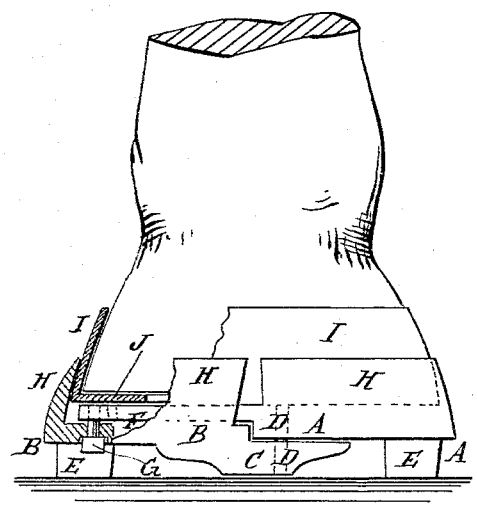
Figure 3:
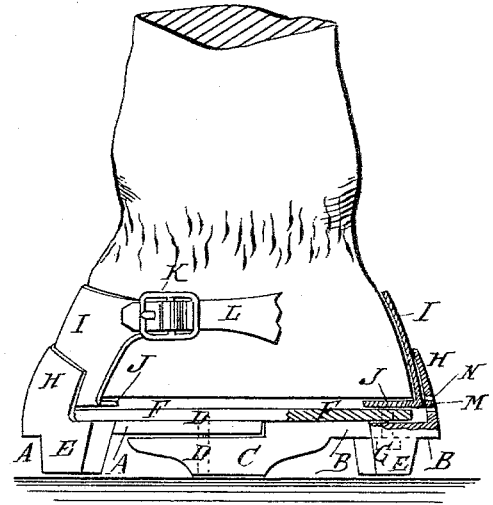

Figure 1 is a plan view of one of my improved horseshoes. Fig. 2 is a front elevation of the same, partly in section, and showing the pad in place. Fig. 3 is a rear elevation of the same, partly in section, and showing the pad in place.

The object of this invention is to facilitate the securing of horseshoes to the horse's feet, and prevent the horse's hoofs from being injured by attaching the shoes or by traveling on rough surfaces.

The invention relates to a horseshoe constructed in two parts hinged to each other at their forward ends having an inwardly-inclined rim upon their outer edges, and provided with a plate formed upon one part and overlapping the other part. The shoe is provided with a pad having a buckle and strap at its rear end, and projections upon its sides to engage with apertures in the sides of the rim of the said shoe, whereby the hoof will be protected from jar in traveling, as will be hereinafter fully described and claimed.

The body of the shoe is made in two parts, A B. Upon the forward end of the part B is formed one end of the toe-calk C, the other end of which underlaps the forward end of the part A, and is connected with it by a hinging pin or rivet, D, so that the rear end of the shoe can be spread to allow it to be placed upon a horse's hoof.

Upon the rear ends of the parts A B are formed heel-calks E, in the ordinary manner.

Upon the upper side of the part A of the shoe is formed a plate, F, of suitable shape and size to receive and support the horse's hoof. The free edge of the plate F rests upon the upper side of the part B of the shoe, and is secured to the said part B, when the shoe is in place upon a horse's hoof, by a bolt, G, passing up through the part B of the shoe, and screwing into a screw-hole in the plate F.

Upon the outer edge of each part A B of the shoe is formed a flange, H, which is drawn inward or contracted toward the upper edge to correspond with and fit upon the outer surfaces of the hoof.

I is a pad, made of leather or other suitable material, shaped to fit upon the outer surface of the hoof, and having an inwardly-projecting flange, J, to underlap the outer part of the bottom of the hoof that rests upon the plate F and relieve the foot from the jar in traveling. With this construction a space will be left between the middle part of the bottom of the hoof and the plate F, to receive air to keep the bottom of the hoof cool.

The pad I J is open at the rear, and is provided with a buckle, K, and strap L at its upper corners for fastening the said pad to the hoof.

Upon the sides of the pad I J, at its lower edge, are formed projections M, which project into apertures N in the lower part of the rim H, to prevent the said pad from slipping out of place when the said pad and the shoe are being placed on the hoof.

The shoe and the pad will be fastened securely to the hoof by the bolt G and the buckle and strap K L, and can be readily removed by taking out the said bolt and unbuckling the said buckle and strap.

Having thus described my invention, what I claim as new, and desire to secure by Letters Patent, is—

1. The combination, with the horseshoe made in two parts, A B, hinged to each other, and provided with the rim H, having apertures N and plate F, of the pad I J, having buckle and strap K L, and projections M, substantially as herein shown and described, whereby the hoof will be protected from jar in traveling, as set forth.

2. A horseshoe constructed in two sections, hinged at their front ends, with an inwardly-inclined flange on the upper edge of each section, a single plate which covers the bottom of the hoof, and secured at the heel by a removable fastening to firmly unite the two sections and the plate upon the hoof, and a flexible boot covering the upper part of the hoof, and which extends under the bottom thereof, so as to be inclosed between the plate and the hoof and held in position by the flanges, as described.

LAWRENCE SCHWAAB.

Witnesses:
JAMES T. GRAHAM,
C. SEDGWICK.